May 3, 1927. F. X. STURM Re. 16,609

GLOVE

Original Filed Dec. 5, 1923

INVENTOR
Frank X. Sturm,
BY
Hood & Hahn.
ATTORNEYS

Reissued May 3, 1927. Re. 16,609

UNITED STATES PATENT OFFICE.

FRANK X. STURM, OF ALEXANDRIA, INDIANA, ASSIGNOR TO THE GLOVE CORPORATION, OF ALEXANDRIA, INDIANA, A CORPORATION OF INDIANA.

GLOVE.

Original No. 1,540,718, dated June 2, 1925, Serial No. 678,555, filed December 5, 1923. Application for reissue filed November 12, 1926. Serial No. 148,079.

My invention relates to improvements in gloves, and particularly to the formation of the fingers of the glove. My invention is especially applicable to work gloves and gloves designed for rough usage being especially useful in connection with that type of glove wherein a part of the glove is formed of fabric, the fingers and palm, which are subjected to the greatest wear, being formed of leather.

My invention has particular reference to the formation of the backs of the fingers and one of the objects of my invention is to provide a blank which will permit of the forming of the backs of the fingers and of the fourchettes from a single piece of material attached to the front finger portions, thereby avoiding seams between the fingers and at their crotches.

For the purpose of disclosing my invention I have illustrated one embodiment thereof in the accompanying drawing in which, Fig. 1 is a rear elevation of that portion of a glove embodying my invention;

Figure 1:
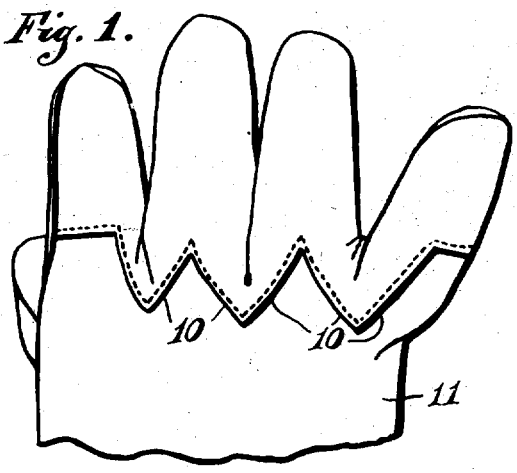
Figure 2:
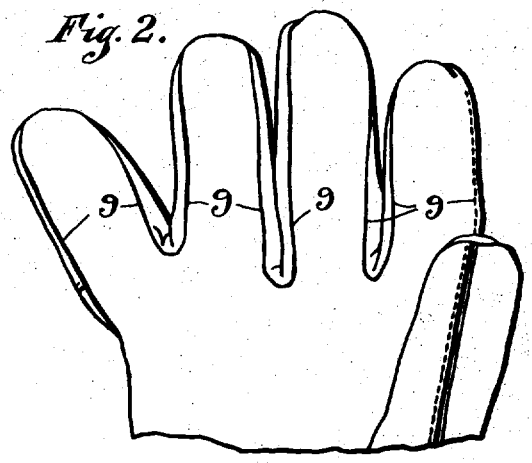
Fig. 2 is a front elevation thereof.
Figure 3:
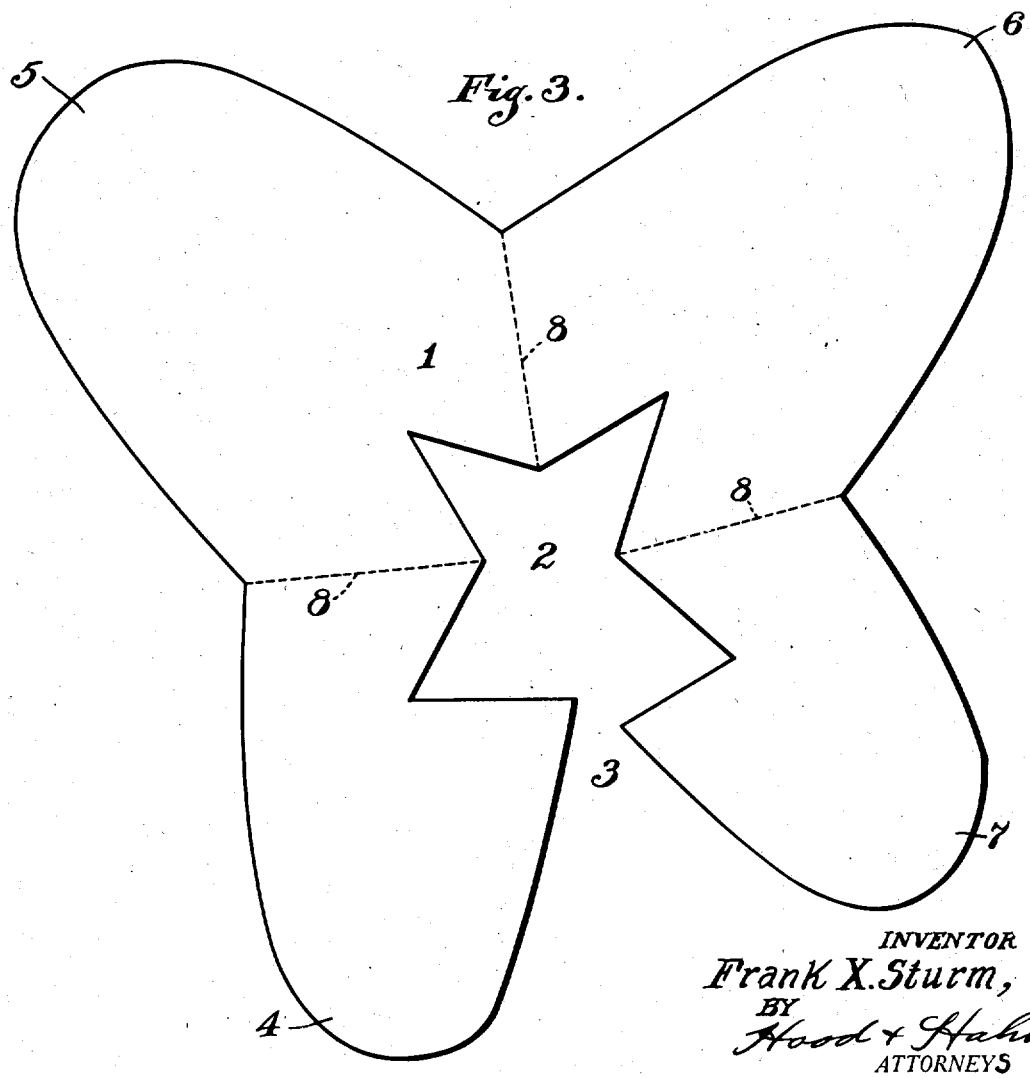
Fig. 3 is a view of the blank forming the backs of the fingers and spread flat.

In the structure illustrated, the blank 1 forms substantially a four pointed star, having a substantially four pointed star shaped center opening 2 and a slit at one point 3. The point 4 of the star shaped blank comprises the first finger, the point 5 of the star forms the second finger and the points 6 and 7 form the third and little fingers respectively. The star shaped opening 2 in the center of the blank provides a means whereby the blank may be folded or doubled at the point indicated by the dotted lines 8 so that a certain amount of fullness will be provided at this point when the finger pieces are brought up to position to be stitched to the front of the glove. It will be noted that the walls of the opening 2 extend at angles to the lines 8, which lines constitute imaginary radial lines extending from the center of the blank outwardly and pass through the juncture of the edges of the star points 4, 5, 6 and 7. The finger blanks are stitched to the front finger blanks toward the front of the glove at 9, leaving the fourchettes and backs of the fingers seamless and avoiding seams in the crotches. When the blank is stitched in position, the walls of the opening 2 provide a lower edge 10 to which the material forming the back 11 of the glove may be stitched.

It is obvious that the same blank may be used for right and left hand gloves by merely reversing the blank.

I claim as my invention:

1. A glove blank for the backs of the fingers of a glove, comprising a substantially star shaped blank, the points of the star forming the finger backs and the center of the blank being slotted at the base of each point to permit the spreading of the material when the blank is folded and secured to the front of the glove.

2. A blank for the backs of the fingers of a glove, comprising a blank of material having four radiating finger projections each of a size for the respective finger and having its center slotted at the base of each projection to permit the bending and folding of the material in attaching it to the front finger portion.

3. A blank for the backs of the fingers of a glove, comprising a substantially star shaped blank, the points of the star forming the backs of the fingers, said blank having a substantially star shaped opening in its center to permit of the bending of the material to position.

4. A blank for the backs of the fingers of a glove having four radial finger blanks, each shaped to form the back of a finger of the glove and each having at its bottom a V shaped slot formed therein.

5. A blank for the backs of the fingers of a glove comprising a four pointed blank the points forming a series of finger-back blanks, each point having a notch at its base when the blank lies flat and two of the points being disconnected to permit the blank to be folded to cause the points to lie substantially parallel flatwise with the portion of the material between the points forming the crotches of the glove fingers.

6. A blank for the backs of the fingers of a glove comprising a flat substantially star shaped blank having an angular opening in the center thereof, the points of the star forming the glove finger backs.

7. A blank for the backs of the fingers of a glove comprising a flat substantially star shaped blank having an angular opening in the center of the blank, the walls of said opening extending at angles to imaginary radial lines passing through the blank at the junction of the edges of the star points, the points of the star forming the backs of glove fingers.

8. A blank for the backs of the fingers of a glove comprising a flat four pointed substantially star shaped blank with the extremities of the points rounded and having an opening at its center, the points of the star forming the backs of the fingers of a glove and the material of the blank being slit from the periphery in to the center opening to leave two of the points disconnected.

In witness whereof, I, FRANK X. STURM, have hereunto set my hand at Columbus, Ohio, this 6th day of November, one thousand nine hundred and twenty-six.

FRANK X. STURM.